Patented Apr. 10, 1923.

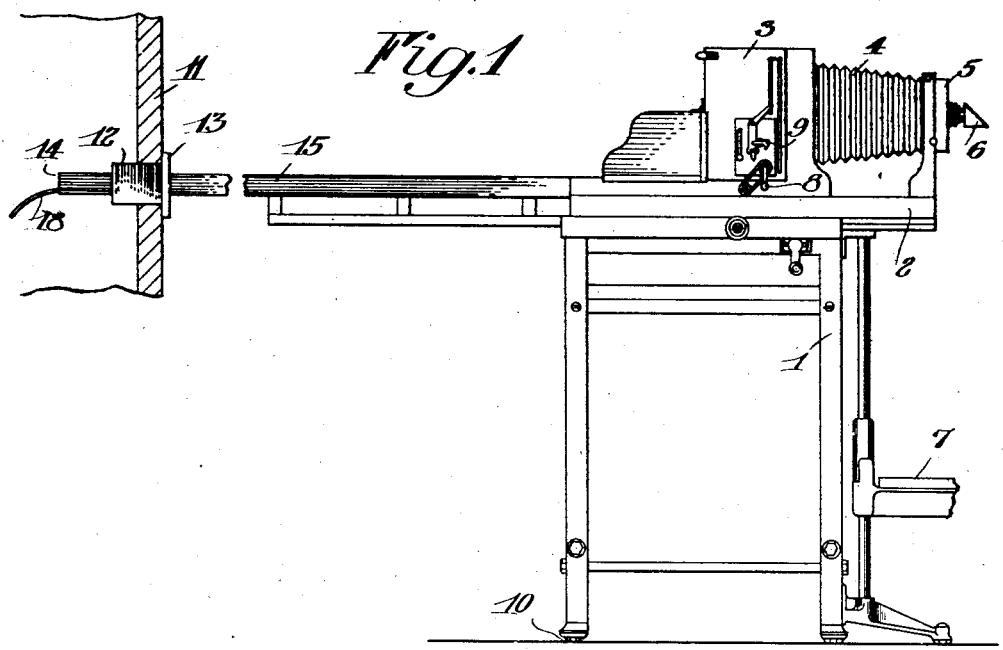
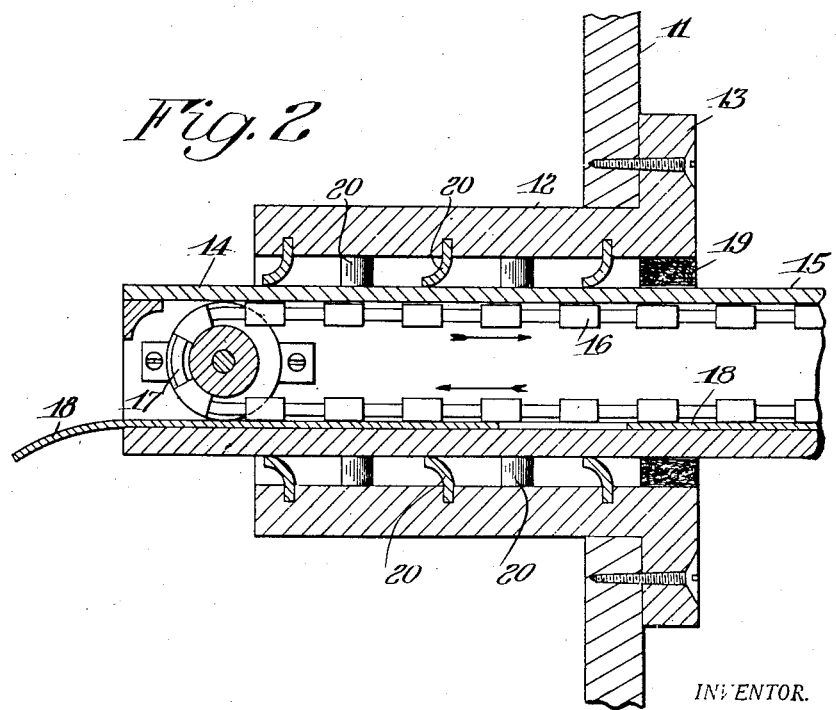

1,451,159

UNITED STATES PATENT OFFICE.

JOHN S. GREENE, OF ROCHESTER, NEW YORK, ASSIGNOR TO COMMERCIAL CAMERA COMPANY, OF PROVIDENCE, RHODE ISLAND, A CORPORATION OF RHODE ISLAND.

PHOTOGRAPHIC DARK ROOM.

Application filed October 8, 1920. Serial No. 415,504.

*To all whom it may concern:*

Be it known that I, JOHN S. GREENE, of Rochester, in the county of Monroe and State of New York, have invented certain new and useful Improvements in Photographic Dark Rooms; and I do hereby declare the following to be a full, clear, and exact description of the same, reference being had to the accompanying drawings, forming a part of this specification, and to the reference numerals marked thereon.

My present invention relates to photography and more particularly to photographic dark rooms and means for transporting prints thereto from the exposing apparatus and the invention has for its object to provide a simple, efficient and convenient means in connection with the portable or movable camera for mechanically transferring exposed photographic material into a nearby dark room without danger of fogging but without destroying the portability of the camera. The improvements are directed in part toward a novel construction of light seal for preventing the entrance of light to the dark room at the point at which the prints are introduced and to these and other ends the invention resides in certain improvements and combinations of parts all as will be hereinafter more fully described, the novel features being pointed out in the claims at the end of the specification.

In the drawings:

Figure 1 is a side view partly in section and partly broken away, of a photographic apparatus constructed in accordance with and illustrating one embodiment of my invention;

Figure 2 is an enlarged sectional view through the light seal and conveying chute shown in elevation in Figure 1.

Similar reference numerals throughout the several views indicate the same parts.

My improvements are particularly applicable to what are known as commercial cameras—a commercial camera being an apparatus in which photographs of small objects that are placed upon a copyholder associated with the camera are made upon a continuous length of sensitized paper that is drawn through the field of exposure, severed and often developed in the same apparatus. It is sometimes desired, however, to take these photographs with great rapidity beyond the speed at which the developing devices can operate, in which case it becomes convenient to be able to deliver the exposed but undeveloped sheets into a dark room to be accumulated for future development or to be received by equipment capable of handling them in greater quantity and my invention contributes to the facility of this latter method.

First referring to the exposing apparatus, this usually comprises a stand or table 1 supporting a bed 2 carrying a camera body 3, bellows 4, front 5 and a lens and prism optical system 6 which allows objects placed upon a copyholder 7 below the prism to be projected into the field of exposure. The sensitive paper is reeled off by means of a crank 8 and severed by an operating member 9, this mechanism being no part of the present invention but an example of a familiar apparatus in which the utility of my invention may be exampled, though as will be later seen, either separate sheets, cut sheets or continuous lengths of sensitive material may be accommodated.

The apparatus is portable on casters 10 or the like and is positioned adjacent to a dark room, a wall of which is shown in section at 11. An opening in this wall is occupied by a tubular light seal case 12 secured thereto by a collar 13 and extending through the case 12 to project at 14 and deliver into the interior of the dark room is a conveyor chute 15 supported on the camera bed 2 and extending rearwardly therefrom. This chute 15 is rectangular, in the present embodiment, and it is connected to receive at its forward end the exposed prints issuing from the camera proper and in the present instance I have shown in Figure 2 a conveying apparatus within the chute consisting of an endless belt 16 travelling over a grooved roll or wheel 17 and adapted to frictionally engage and slidably transport along the bottom of the chute the prints shown at 18 in the manner, for instance, disclosed in my prior Patent No. 1,361,251 dated December 7th, 1920.

To prevent vibration and also, in a measure, to obstruct light, I support the chute 15 upon a felt or similar gasket 19 that lines the front end of the case 12 in the region of the collar 13. At intervals throughout the length of the remainder of the case 12 I form an effective light seal by the provision of a plurality of transverse elastic rubber strips 20 set into each wall and yielding sufficiently to closely and intimately engage in a light-tight manner the corresponding wall of the chute. Preferably, the strips on adjoining walls alternate with each other, as shown.

It will be seen that these strips or ribs, while effectively excluding light, do not interfere with changes in position of the chute 15 incident to movement of the camera and they yield to permit the chute to be entirely removed and reinserted in case the exposing apparatus associated with the dark room is to be moved to a distant point as for instance, between operations or jobs upon which the camera is not used continuously. Also, the present camera, for instance, is of a type in which the focus is changed by moving the body or film support 3 instead of the front 5 and in case the chute 15 is rigidly attached, this must move also, which movement in no way interferes with the effectiveness of the light seal that I have produced.

I claim as my invention:

1. In a photographic apparatus, the combination with a dark room of a light tight conveying chute extending into the same, an exposing mechanism arranged exteriorly of the dark room and adapted to discharge exposed photographic material into the chute, and a light seal surrounding the chute within a wall of the dark room said light seal comprising a tubular member provided with elastic ribs adapted to press against the walls of the chute and to yield sufficiently to permit the insertion and withdrawal of the latter.

2. In a photographic apparatus, the combination with a dark room of a light tight conveying chute extending into the same, an exposing mechanism arranged exteriorly of the dark room and adapted to discharge exposed photographic material into the chute, and a light seal surrounding the chute within a wall of the dark room said light seal comprising a tubular member projecting from such wall and having secured to each interior wall thereof a plurality of elastic ribs adapted to press against the walls of the chute and to yield sufficiently to permit the insertion and withdrawal of the latter.

3. In a photographic apparatus, the combination with a dark room having an opening in a wall thereof, of a movably mounted exposing mechanism arranged exteriorly of the dark room, a conveying chute carried by the said mechanism and extending through the opening in the dark room, the exposing mechanism being adapted to discharge exposed prints into said chute, and a light seal surrounding the chute within the opening and adapted to press against the walls of the chute and to yield sufficiently to permit the insertion and withdrawal of the latter according to the movements of the exposing mechanism.

JOHN S. GREENE.